(No Model.) 2 Sheets—Sheet 2.
L. L. SAWYER.
SPRING ROLLER FOR CURTAINS.
No. 288,123. Patented Nov. 6, 1883.

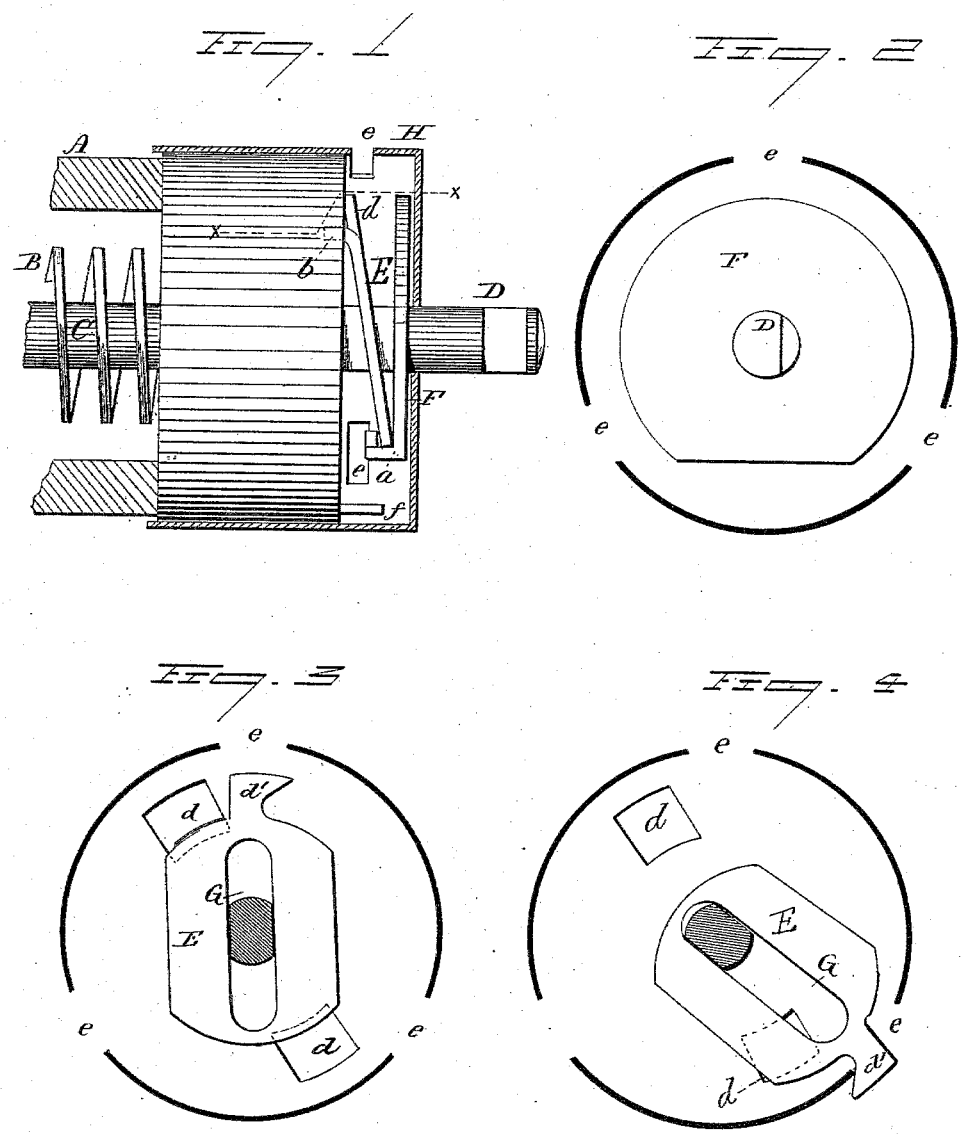

UNITED STATES PATENT OFFICE.

LODOWICK L. SAWYER, OF MERIDEN, CONNECTICUT.

SPRING-ROLLER FOR CURTAINS.

SPECIFICATION forming part of Letters Patent No. 288,123, dated November 6, 1883.

Application filed September 19, 1883. (No model.)

*To all whom it may concern:*

Be it known that I, LODOWICK L. SAWYER, of Meriden, in the county of New Haven and State of Connecticut, have invented a new Improvement in Spring-Rollers for Curtains; and I do hereby declare the following, when taken in connection with accompanying drawings and the letters of reference marked thereon, to be a full, clear, and exact description of the same, and which said drawings constitute part of this specification, and represent, in—

Figure 5:
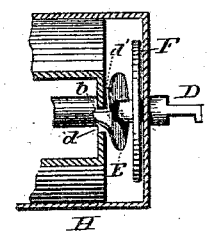
Figure 6:
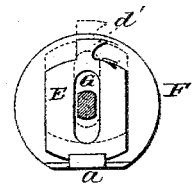

Figure 1, a sectional side view; Fig. 2, an end view, showing the spindle as fixed in the bracket; Fig. 3, a transverse section outside the pawl, looking toward the roll, showing the pawl as engaged with the roll in its usual working condition in the bracket; Fig. 4, a section on the same line, showing the pawl as engaged with the roll when removed from the bracket; Fig. 5, a horizontal section on line *x x* of Fig. 1; Fig. 6, a transverse section between the pawl and end of the roll, and looking toward the bracket.

This invention relates to an improvement in that class of curtain-fixtures in which the roll is constructed with a longitudinal chamber at one end, concentrically through which is a spindle extending outward into a bracket, where it is fixed as to rotation, with a helical spring arranged in the chamber of the roll and around the spindle, one end attached to the spindle and the other to the roll, whereby in drawing down the curtain the roll is rotated and winds the spring, so that when free to react the spring will turn the roll in the opposite direction and wind the curtain onto the roll; and particularly to that class in which a pawl is hinged or hung in connection with the spindle in a plane at substantially right angles to the axis of the spindle, and so that it may fall by its own gravity toward the end of the roll to engage a notch in the end of the roll and hold the curtain at any desired position, but so that, if the ascent of the curtain, and consequent revolution of the roll, be rapid, the pawl cannot enter the notch in the end of the spindle, and therefore will permit the roll to thus revolve; but when the speed of rotation of the roll be retarded sufficiently, then the pawl will engage the roll. This construction is shown in Fig. 1, and in which A represents the roll; B, a helical spring arranged in a longitudinal chamber in the roll; C, the spindle, its outer end, D, fitted for engagement with the bracket, so as to prevent rotation, and in the usual manner. One end of the spring B is attached to the roll and the other to the spindle, and so that when the spindle is held in its bracket the rotation of the roll, as in unrolling the curtain, will wind the spring. Attached to the spindle and outside the roll a disk, E, is hung to the spindle, as at *a*, here represented as upon the inner face of a disk, F, which is attached to or made a part of the spindle, and so as to be held stationary with the spindle when fixed in the bracket. The hinging-point of the pawl is so far distant from the end of the roll that its upper or nose end, *b*, inclines toward the roll, and by its own gravity falls toward the roll. In the end of the roll is one or more notches, *d*, into which the nose *b* of the disk or pawl will fall. The nose *b* of the pawl is shaped, as seen in Fig. 5, square upon one side and inclined upon the opposite side, the square end being in a direction to engage the roll and prevent its rotation under the reaction of the spring, but so that when the roll revolves in the opposite direction under the action of the spring, the shoulder or notch in the roll will strike the incline on the pawl and force the pawl outward, so that the roll may escape from the pawl. This is a common and well-known construction. In this class of curtain-fixtures a difficulty is experienced arising from the liability of the spring to run down when the fixture is not secure in the bracket. The spring must be wound to a certain extent before it is placed in the bracket, so as to acquire sufficient strength to support the curtain in its highest or completely-wound condition. If the nose of the pawl or disk E be engaged with the notch in the roll, it will so hold the spring in its wound condition that the spindle may be disengaged from the bracket, as in removing the roll, and the spring still be held; but if in removing the spindle from the bracket the person, as one almost unavoidably will, turns the roll with relation to the spindle, so as to throw the pawl out of engagement with its notch, then instantly upon removing the spindle from its engagement with the bracket the spring will run down, and unless the person be experienced with this class of fixtures its rearrangement to properly operate is almost impossible. Again, as many of these fixtures are sent to market and sold to persons to be put up by themselves, the same difficulty is experienced as in removing the roll, because of the liability of the spring to obtain its freedom and run down. Many devices have been made to operate between the roll and spindle to automatically engage the roll and spindle when out of the bracket, and so that the spring may be wound at the manufacturer's and remain so until placed in the bracket, and also so as to prevent the spring from running down when removed from the bracket; but these devices have as a general thing been complicated and independent of the pawl, which operates to engage the roll on slow speed when in the bracket.

The object of my invention is to adapt the particular construction hereinbefore described to operate as a device to automatically and positively engage the roll and spindle when not in the bracket, and without regard to the engaging position of those two parts when in the bracket; and the invention consists in the construction as hereinafter described, and more particularly recited in the claims.

Instead of hinging the pawl E, as at $a$, so as to have only a swinging or vibratory movement toward and from the end of the roll, I construct it with a diametrical slot, G, somewhat narrower than the diameter of the spindle and flatten the spindle upon its two sides, so that the pawl set over this part of the spindle will be permitted to swing toward and from the end of the spindle, as before, but will also be free to move radially in the line of the slot G; and I make the seat $a$ so as to permit a certain amount of radial movement of the pawl, and so that when standing in its working condition, as seen in Fig. 1, the pawl will operate in the before-mentioned and usual manner. From the pawl I make a radial projection, $d'$, preferably of hook shape, the hook being in the direction in which the spring will revolve the spindle. The spindle extending through the slot G, if it be free to revolve, will revolve the pawl with the spindle. The projection $d'$ will be substantially the slot G. Around the end of the roll is a flange, H, in which are one or more openings, notches, or shoulders, $e$. The internal radius of this flange is somewhat greater than the radius of the pawl, including the projection $d'$. If the roll be taken from the bracket, so as to release the spindle, the first operation of the spring the instant the spindle escapes from the bracket is to impart a quick, rapid rotation thereto. This rapid rotation imparts centrifugal force to the pawl, which tends to throw the heavier end or projection $d'$ outward and into contact with the inside of the flange H. The openings or shoulders $e$ being in line with the projection $d'$ in such rotation, the centrifugal force thus imparted to the pawl forcing it outward will cause the projection $d'$ to enter the first notch $e$ in its path, and as seen in Fig. 4, which will arrest its further rotation and engage the spindle and roll, so that the spring cannot run down. The hook shape of the projection makes the engagement more positive or prevents accidental disengagement, for with such a hook shape the spindle cannot be disengaged until it be mechanically turned in the opposite direction to that with which the engagement was made. This rotation of the spindle and pawl takes the spindle into a different position from which it held in relation to the notches $e$ in the end of the roll, and so that in replacing the roll in the bracket the spindle will be set in its seat in the bracket in its predetermined position, and so that when so fixed the projection $d'$ of the pawl will be at the top, and the pawl will be hung by its nose to the flange above its seat $a$, as seen in broken lines, Fig. 6. Then as soon as the curtain is drawn downward to relieve the pawl from its engagement with the roll, the pawl will fall to its normal position, as seen in Figs. 3 and 6, and the fixture be in its proper working condition. By this construction, therefore, the single pawl E serves the double purpose of engaging the roll in the ordinary working of the curtain, and also to engage the roll and spindle when removed from the bracket.

Instead of making the flange H at the end of the roll and constructing it with shoulders or notches $e$, these shoulders or notches may be made by simply introducing a pin into the end of the roll, as indicated at $f$, Fig. 1.

I claim—

1. The combination of the roll A, spindle C, arranged longitudinally therein and concentric therewith, the spring B within said roll, one end fixed to the spindle and the other to the roll, the spindle constructed for engagement with the bracket to prevent its rotation, yet permit the roll to revolve, and the pawl E, hung to the spindle, and so as to swing in a plane parallel with the axis of the spindle, and also free for radial movement, the roll constructed with a shoulder or wall of the openings, with which the pawl will engage to arrest the winding of the curtain upon the roll, and also provided with a notch or shoulder, $e$, with which the pawl cannot engage when the spindle is fixed in the bracket, but with which, under centrifugal force, the pawl will engage when the spindle is removed from the bracket, substantially as described.

2. The combination of the roll A, spindle C, arranged longitudinally therein and concentric therewith, the spring B within said roll, one end fixed to the spindle and the other to the roll, the spindle constructed for engagement with the bracket to prevent its rotation, yet permit the roll to revolve, and the pawl E, hung to the spindle, and so as to swing in a plane parallel with the axis of the spindle, and also free for radial movement, the pawl constructed with a hook-shaped projection, $d$, and the roll with a shoulder or openings arranged with relation to each other, so that when fixed in the bracket the said projection $d'$ cannot engage with the shoulder or wall of the opening, but when the spindle is removed from the bracket, then, under centrifugal force imparted through the spindle, the projection $d'$ on the pawl will be thrown into hooked engagement with said shoulder or wall of the opening, substantially as described.

LODOWICK L. SAWYER.

Witnesses:
WM. T. RIGHTMYER,
L. J. GAINES.